(12) United States Patent
Brunetti et al.

(10) Patent No.: US 7,896,750 B2
(45) Date of Patent: Mar. 1, 2011

(54) SEALING ARRANGEMENT BETWEEN A CONSTANT VELOCITY JOINT AND A HUB BEARING UNIT OF A MOTOR VEHICLE WHEEL

(75) Inventors: Marco Brunetti, Turin (IT); Cristian Concu, Turin (IT)

(73) Assignee: Aktiebolaget SKF, Gothenburg (SE)

( * ) Notice: Subject to any disclaimer, the term of this patent is extended or adjusted under 35 U.S.C. 154(b) by 542 days.

(21) Appl. No.: 11/968,522

(22) Filed: Jan. 2, 2008

(65) Prior Publication Data
US 2008/0174112 A1 Jul. 24, 2008

(30) Foreign Application Priority Data
Jan. 4, 2007 (EP) .................................. 07100093

(51) Int. Cl.
*F16D 3/84* (2006.01)
(52) U.S. Cl. ........................................ 464/173; 464/178
(58) Field of Classification Search ................ 464/173, 464/178, 906; 384/544, 589; 277/634
See application file for complete search history.

(56) References Cited

U.S. PATENT DOCUMENTS

| | | | |
|---|---|---|---|
| 6,139,216 A * | 10/2000 | Bertetti | ...................... 464/906 |
| 6,354,952 B1 | 3/2002 | Boulton et al. | |
| 7,270,483 B2 * | 9/2007 | Ishiguro | ................. 384/544 X |
| 2002/0070506 A1 | 6/2002 | Krude | |

FOREIGN PATENT DOCUMENTS

| | | |
|---|---|---|
| EP | 1 308 315 A2 | 5/2003 |
| EP | 1 548 307 A1 | 6/2005 |
| JP | 2001-150905 | 6/2001 |

\* cited by examiner

*Primary Examiner*—Greg Binda
(74) *Attorney, Agent, or Firm*—Merchant & Gould P.C.

(57) ABSTRACT

One end of a resilient sleeve is fitted on a tubular projection of the bell of a constant velocity joint. The sleeve covers a radial slot formed in the projections and the arms of a spring locking ring for axially removably securing the joint bell to a toothed driving ring fixed on a rotatable hub. The other end of the sleeve has a radially inwardly projecting flange which is sealingly axially clamped against a rigid annular part secured to or integral with the hub.

6 Claims, 4 Drawing Sheets

SEALING ARRANGEMENT BETWEEN A CONSTANT VELOCITY JOINT AND A HUB BEARING UNIT OF A MOTOR VEHICLE WHEEL

BACKGROUND OF THE INVENTION

The present invention refers to a sealing arrangement for the coupling zone between a constant velocity joint and a hub bearing unit of a motor vehicle wheel.

Arrangements are known from patent publications US 2002/0070506 A1 and U.S. Pat. No. 6,354,952 B1 wherein the hub of the wheel receives the driving torque from the bell of the constant velocity joint through a splined coupling. To this end, fixed on the hub is a ring with an axial outer toothing that is inserted in a tubular projection with an inner axial toothing of the outer part or "bell" of the constant velocity joint. The toothed ring and the tubular projection are both provided with a respective circular groove in which an elastic, open locking ring is fitted. This elastic ring has arms at its ends that project through a slot formed at the axially outer end (or outboard end) of the joint bell. Illustrated in FIG. 5 of US 2002/0070506 is a sealing elastic sleeve which, at one end, is positioned on an outer cylindrical surface of the tubular projection of the joint bell, covering from the outside the said slot and the end arms of the locking ring, and at the other end sealingly cooperates with an annular part fixed to the end to the hub, particularly with an insert of a sealing device of the bearing.

A scarcely efficient sealing allows water to penetrate, especially through the slot formed at the end of the joint bell, into the splined interface zone. Rust formed at the interface of the splined coupling renders the disassembling operation of the hub-bearing unit from the constant velocity joint particularly difficult, besides shortening the life of this members.

SUMMARY OF THE INVENTION

The main object of the invention is to ensure a reliable hermetic sealing for the interface zone between the constant velocity joint and the hub bearing unit. Another object of the invention is to provide a sealing device which may be easily mounted and disassembled during repeated servicing operations throughout the lifetime of the bearing and the joint. A further object of the invention is to guarantee the sealing action without adversely affecting operation of other sealing devices on the hub bearing unit.

The above and other objects and advantages, which will be better understood in the following, are achieved according to the invention by a sealing device having the features set forth in the appended claims.

BRIEF DESCRIPTION OF THE DRAWINGS

A preferred, but not limiting embodiment of the invention will now be described, reference being made to the accompanying drawings, in which.

DETAILED DESCRIPTION OF THE PREFERRED EMBODIMENTS

Figure 1:
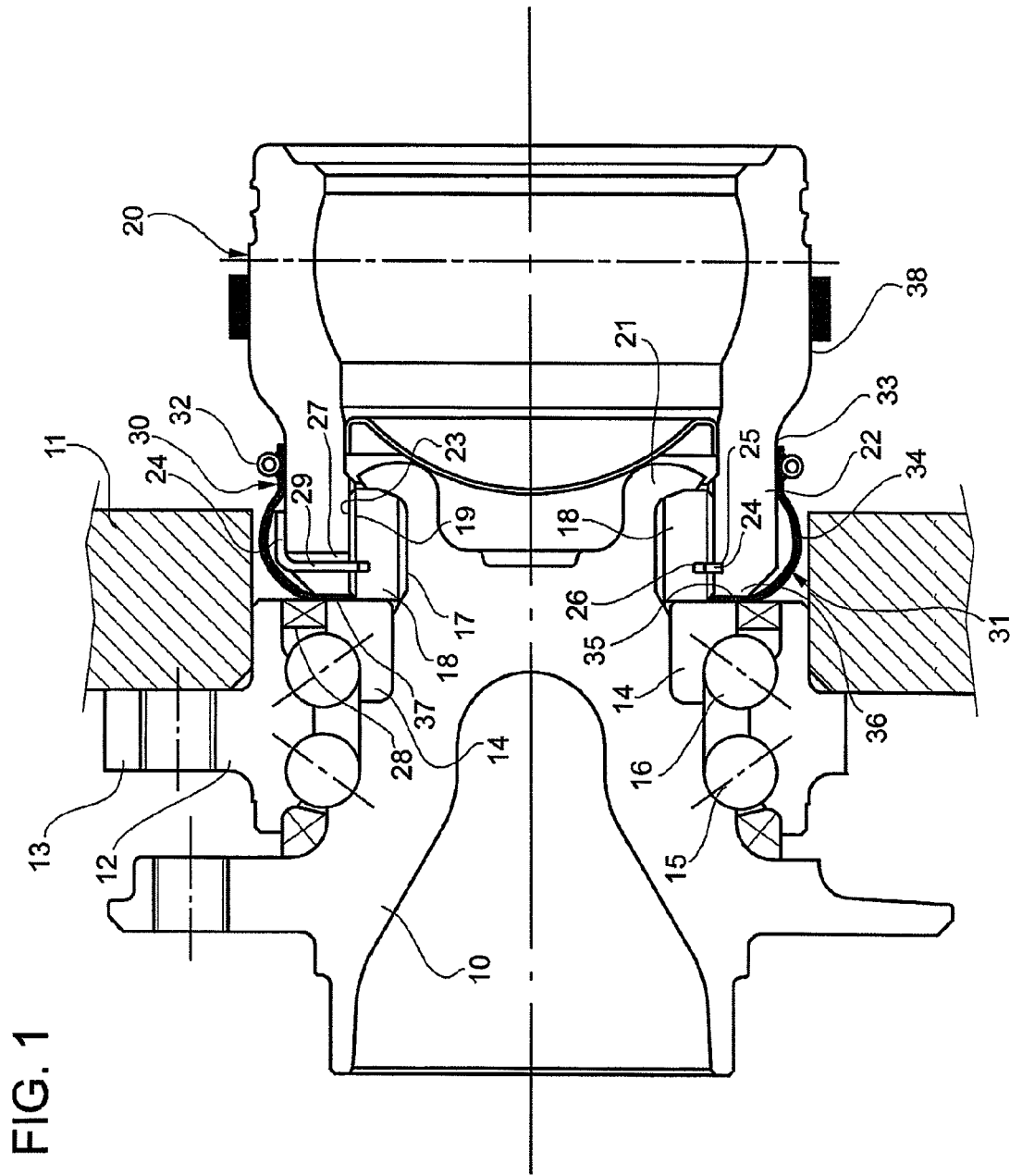
FIG. 1 is an axial cross section view of a sealing device mounted on a constant velocity joint coupled to a hub bearing unit.

With reference initially to FIG. 1, a hub 10 for a driving wheel of a motor vehicle is rotatably mounted in the suspension standard 11 of the motor vehicle through a bearing unit which includes an outer stationary race 12 having a flange 13 fixed to the standard through bolts (not shown). Locked onto the hub 11 is an inner bearing race 14 that forms the inner raceway for one of the two sets of balls 15, 16 of the bearing unit. The hub has a cylindrical surface 17 towards its axially outer end, onto which there is fixed a driving ring 18 with outer axial splines 19 for transferring the driving torque from the bell 20 of the constant velocity joint to the hub. The driving ring 18 is securely axially locked against the inner bearing race 14 by cold forming, preferably by orbital rolling, of an end edge 21 of the hub. At its axially outer side, the joint bell 20 forms a tubular projection 22 with inner axial splines 23 which couple with the outer splines 19 of the driving ring 18.

The driving ring 18 and the joint bell 20 are axially removably joined by an elastic open securing ring 24 which is received partly in an inner circular groove 25 of the bell 20, and partly in an outer circular groove 26 of the driving ring 18. The locking ring 24 has two radial arms 29 at its end, with axially bent appendixes extending through a slot 27 formed at the axially outer end of the tubular projection 22 of the bell 20. In the drawings, only one of the two arms 29 is shown.

Indicated overall at 30 is a sealing device for hermetically sealing from the outside the zone of the coupling between the constant velocity joint and the hub bearing unit. The sealing device 30 comprises a flexible sealing sleeve 31 of elastomeric material and a circumferential clamping spring 32.

The sealing sleeve 31 has a main, substantially tubular portion 34 which is sealingly locked by means of the spring 32 around the outer cylindrical surface 33 of the tubular projection 22 of the joint. In order to facilitate the assembling and disassembling steps, the tubular portion 34 preferably has a free or non-deformed size which is greater than the outer diameter of the cylindrical surface 33, so that the projection 22 may easily be slipped into and out of the sleeve 31. The sealing action of the sleeve against the joint bell is ensured mechanically by the spring 32.

At its axially outer side, the sleeve 31 has a flange 35 projecting in a radially inner direction that is clamped along its circumference between the joint bell 20 and the hub bearing unit, in this example between a radial end face 36 of the bell on the axially outer side and radial face 37 of the bearing inner race 14. The axial clamping of the flange 35 between the two parallel surface members that are securely locked to one another in the axial direction guarantees a particularly efficient sealing action on the side of the hub bearing unit.

Figure 5:
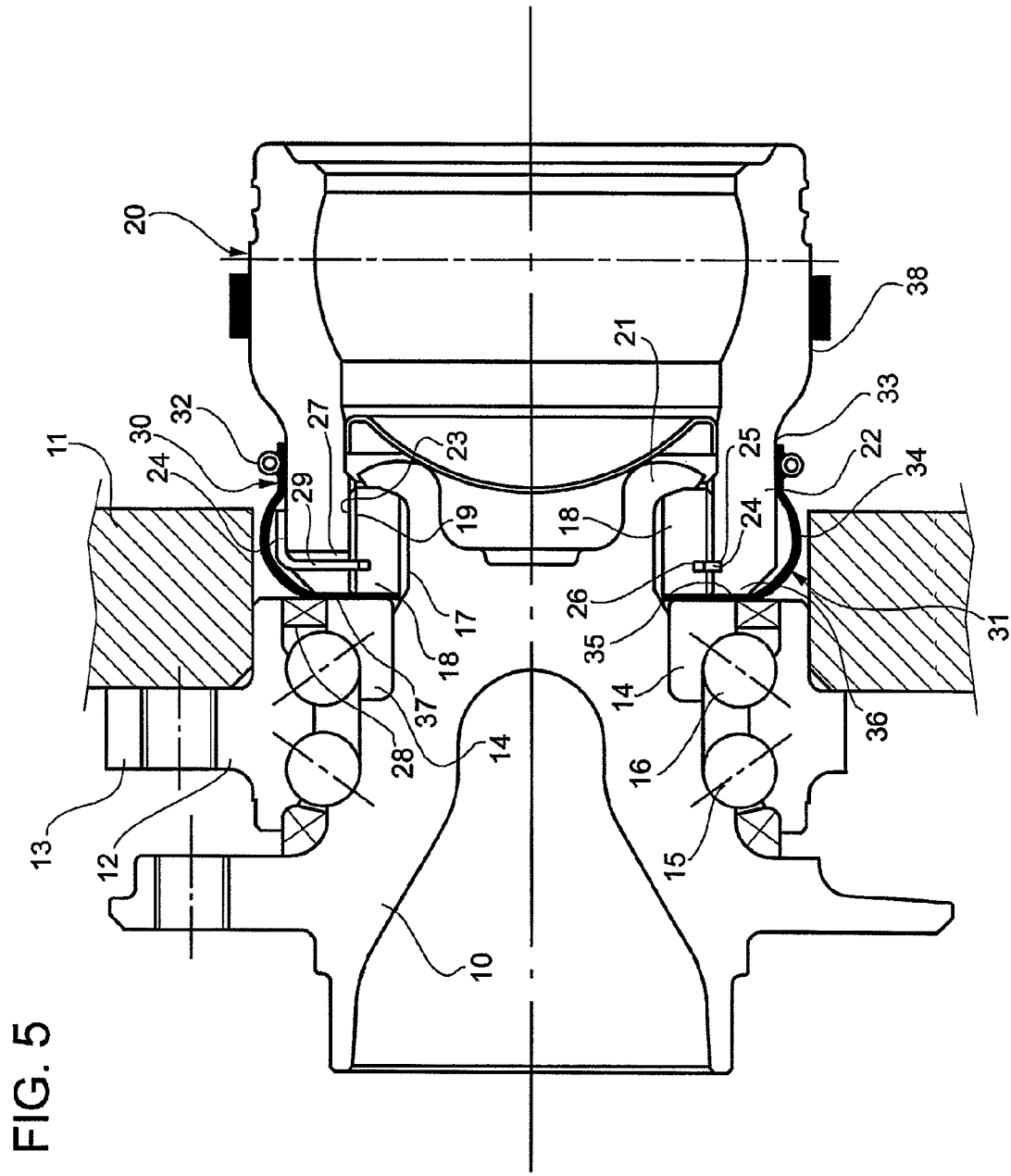
FIG. 5 is an axial cross section view of an alternate embodiment of a sealing device mounted on a constant velocity joint coupled to a hub bearing unit.

It will be noticed in FIG. 1 that a part of the flange 35 contacts a conventional sealing device 28, shown schematically, which seals the gap between the bearing races 12 and 14 and which generally comprises a pair of facing annular inserts (not shown) in mutual sliding contact through one or more sealing gaskets. In order not to jeopardize the sealing effect of the device 28, which may be countered if the relative position of its inserts should undergo accidental changes (for example following a stroke), the flange 35 should not exert an appreciable pressure against the sealing device 28. Preferably, as shown in the example of FIG. 1, the flange 35 should be clamped axially between a rigid essentially non deformable element of the hub bearing unit, such as the bearing race 14 and the joint bell 20. According to a variant of the invention shown in FIG. 5, the flange 35 of the sealing device 30 may be clamped between the inner bearing race 14 and the driving ring 18. In this case the flange 35 may consist of an annular disk of rigid material onto which the elastomeric sleeve 31 is vulcanized or glued.

Figure 2:
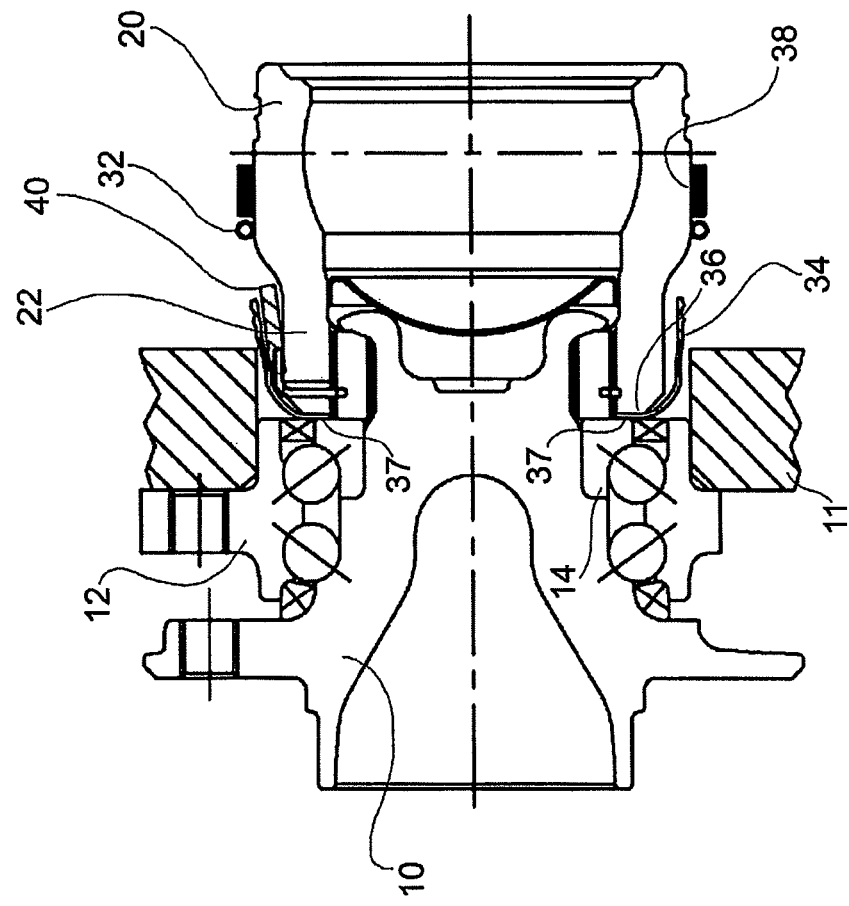
FIGS. 2-4 are views schematically showing the assembling steps of the assembly shown in FIG. 1.

In order to assemble the constant velocity joint with the hub bearing unit, the latter is preliminarily mounted on the suspension standard (FIG. 2). The locking ring 24 is fitted in the groove 26 of the driving ring 18. The end arms 29 of the locking ring 24 are then contracted together, and this elastic ring is held in this elastically contracted condition in which it is completely contained within the groove 26 of the driving ring 18. The two end arms are held one against the other by a retainer tool indicated schematically at 40. The sealing sleeve 31 is located around the driving ring 18 with the flange 35 resting adjacent to the face 37 of the inner bearing race 14.

Figure 3:
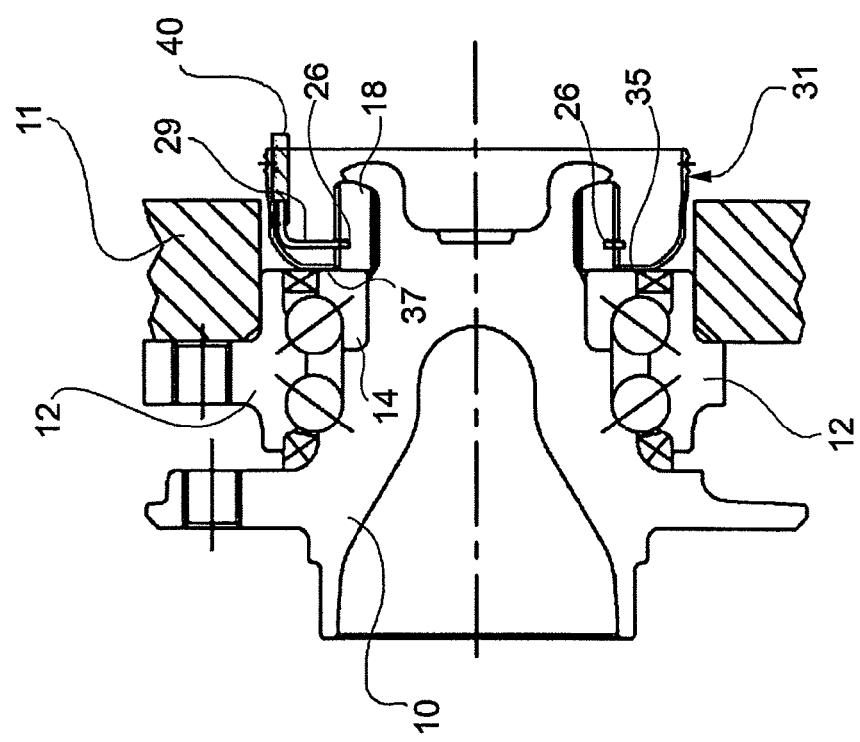
Figure 4:
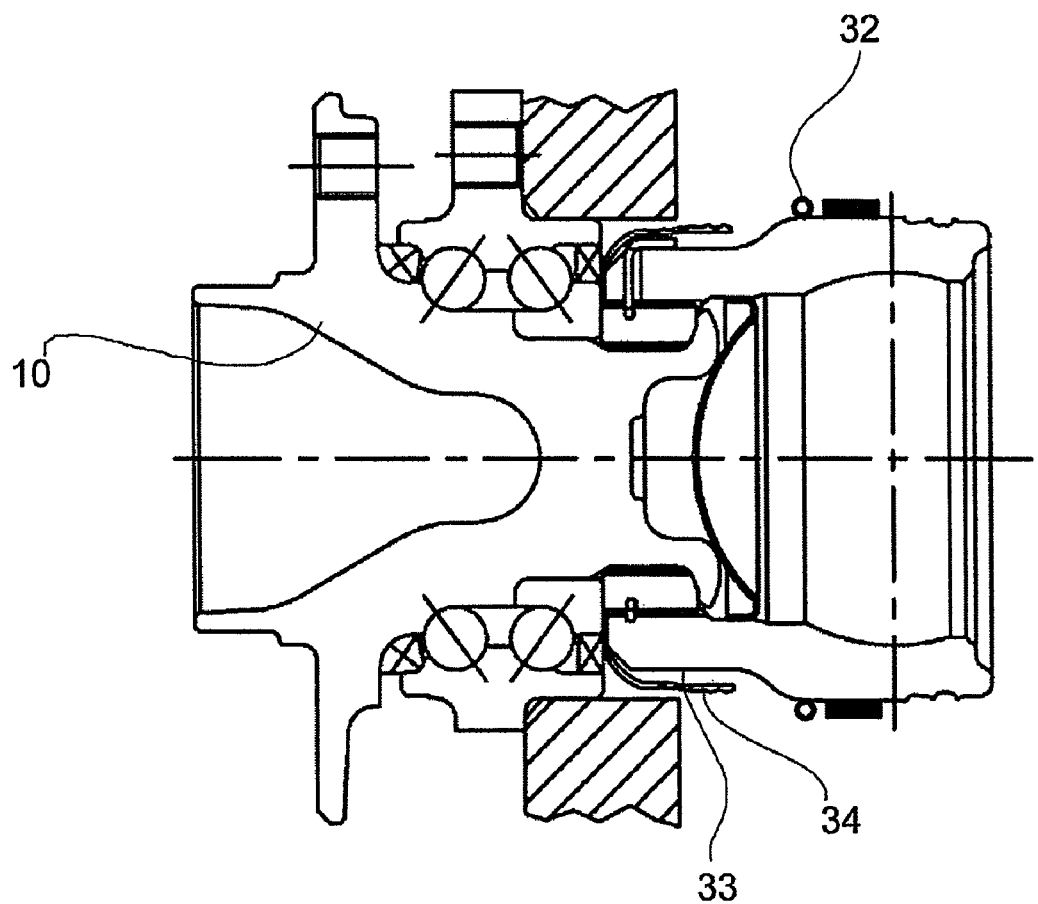
Figure 6:
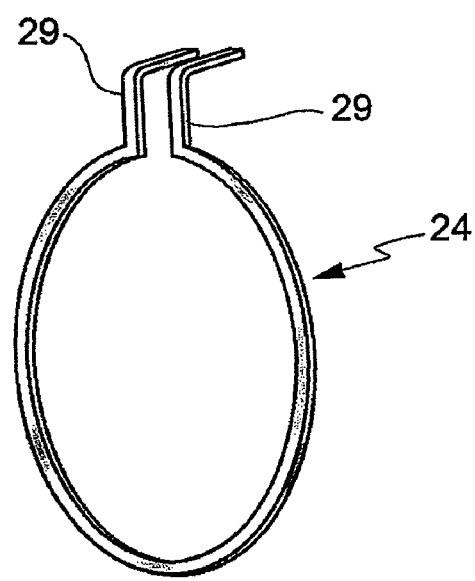
FIG. 6 is perspective view of a locking ring for the sealing device shown in FIG. 1.

Then (FIG. 3) the joint bell 20 is slipped telescopically with the splines 19 and 23 provided on the outside of the driving ring 18 and in the inside of the tubular projection 22 mutually engaging one another, until the axial outer end face 36 of the bell abuts against the flange 35 of the sleeve 31, which remains axially clamped between the constant velocity joint and the hub bearing unit (FIG. 3). As shown in FIGS. 3 and 4, the tubular portion 34 of the sealing sleeve has a free or non deformed radial size greater than the outer diameter of the cylindrical surface 33 of the constant velocity joint bell, so as to facilitate insertion of the tubular projection 22 into the sleeve during the same assembling step of the joint with the hub bearing unit. The circumferential spring 32 is provisionally located on the outer surface of the joint bell, on a cylindrical surface 38 thereof having a diameter that is greater than that of the cylindrical surface 33 of the tubular projection. In the so reached abutting position, the inner groove 25 fainted in the tubular projection of the bell is aligned with the groove 26 formed on the outside of the driving ring 18.

By removing the retainer tool (FIG. 4), the arms 29 of the elastic ring are released allowing the locking ring 24 to expend and reach its operational position, shown in FIG. 1 where the ring 24 engages both the aligned grooves 25, 26 and therefore keeps the constant velocity joint axially secured to the hub bearing unit. Finally, the spring 32 is moved along the joint bell so as to radially clamp the tubular portion 34 of the sleeve against the tubular projection 22 of the joint.

It will be appreciated that the hermetic coupling between the hub bearing unit and the constant velocity joint is ensured mechanically, on one side, by the same assembling of this two subassemblies. The flange 35 of the elastic sleeve that remains clamped guarantees hermetic sealing at the interface between the two subassemblies. The elastic sleeve covers the zone of the slots 27 of the constant velocity joint and is reliably closed by means of circumferential spring 32 which ensures mechanically the sealing action towards the axially inner side. By removing the circumferential spring to the disassemble the hub bearing unit for the constant velocity joint, the axially inner end of the sleeve is free to expend elastically and allows to easily insert the tool that brings the arms of the locking ring 24 near to one another. The constant velocity joint may thus be released and separated from the hub bearing unit without destroying the elastic sleeve.

What is claimed is:

1. A sealing arrangement between a hub bearing unit for a motor vehicle wheel and an associated constant velocity joint, the hub bearing unit comprising a rotatable hub to which a driving ring is fixed for providing torque transmission to the hub from an outer, rotatable bell member of the constant velocity joint, the bell member having a tubular projection in telescopic relation with the driving ring, and a radial slot axially extending to an end side of the bell member facing a rotatable member of the hub beating unit, the driving ring and the tubular projection having respective outer and inner circular grooves accommodating a spring locking ring for releasably axially securing the joint bell to the driving ring, the locking ring having arms extending radially outwardly through the slot, a resilient sleeve being fitted with a first end thereof on an outer surface on the tubular projection, the radial slot and the arms of the spring locking ring being covered from the outside, a second other end of the sleeve having a radially inwardly projecting annular flange sealingly cooperating with a rigid annular part secured to or integral with the wheel hub;

wherein the radially inwardly projecting flange is axially clamped against the rigid annular part.

2. A sealing arrangement according to claim 1, wherein the flange is axially clamped between the end side of the joint bell and the rigid annular part secured to or integral with the hub.

3. A sealing arrangement according to claim 2, wherein the flange is axially clamped between the end side of the joint bell and a radially inner bearing race secured to the hub.

4. A sealing arrangement according to claim 1, wherein the flange is axially clamped between the driving ring and a radially inner bearing race secured to the hub.

5. A sealing arrangement according to claim 1, wherein associated with the first end of the resilient sleeve is a circumferential spring radially and sealingly tightening the first end of the sleeve against an outer cylindrical surface of the tubular projection.

6. A sealing arrangement according to claim 5, wherein the resilient sleeve forms a main, substantially cylindrical portion ending at said first end and having an inner diameter which in a free condition of the sleeve, non-deformed by the circumferential spring, is greater than the outer diameter of the outer cylindrical surface of the tubular projection.

\* \* \* \* \*